United States Patent [19]
Yuta

[11] Patent Number: 5,902,085
[45] Date of Patent: May 11, 1999

[54] PRESS TYPE NUT

[75] Inventor: Kiyoteru Yuta, Toyohashi, Japan

[73] Assignee: Emhart Inc., Newark, Del.

[21] Appl. No.: 09/008,799

[22] Filed: Jan. 20, 1998

[30] Foreign Application Priority Data

Jan. 20, 1997 [JP] Japan ..................... 9-007551

[51] Int. Cl.$^6$ .............................. F16B 37/08; F16B 39/36
[52] U.S. Cl. ......................... 411/433; 411/267; 411/270; 411/908
[58] Field of Search .................... 411/265, 267, 411/270, 433, 437, 908

[56] References Cited

U.S. PATENT DOCUMENTS

| | | | |
|---|---|---|---|
| 3,376,638 | 4/1968 | Bjalme et al. | 411/433 X |
| 4,954,032 | 9/1990 | Morales | 411/433 X |
| 5,081,811 | 1/1992 | Sasaki | 411/433 X |
| 5,340,252 | 8/1994 | Weddendorf | 411/267 |
| 5,427,488 | 6/1995 | Fullerton et al. | 411/267 |

FOREIGN PATENT DOCUMENTS 325069   7/1989   European Pat. Off. .......... 411/433

*Primary Examiner*—Neill Wilson
*Attorney, Agent, or Firm*—Edward D. Murphy

[57] ABSTRACT

A press-nut is adapted to engage with the threads of a bolt by pressing the nut onto the bolt to receive the bolt in an insertion hole thereof. The press-nut comprises a plastic nut body, and a plastic tubular cap member adapted to be coupled to the nut body to contain the nut body therein and to provide the press-nut with its external appearance. The cap member has a wide opening at one end so as to receive and contain the nut body and a small hole at the other end, through which the bolt is inserted. The nut body comprises a base portion, at least two screw portions forming a nut as a whole and having threaded grooves on the inner walls thereof, and spring portions extending from the base portion and connected to the respective screw portions with each spring portion resiliently biasing the corresponding screw portion so as to be pressed upward from the base portion. The outer surface of each screw portion is tapered gradually to reduce the diameter towards the bolt insertion hole on the other end and the inner side of the cap member is also tapered to reduce the inner diameter thereof in accordance with the tapered surface of the screw portions.

9 Claims, 9 Drawing Sheets

PRESS TYPE NUT

BACKGROUND OF THE INVENTION

The present invention relates to a press-nut adapted to engage with the threads of a bolt, by pressing the nut onto the bolt to receive the bolt in an insertion hole thereof.

A press-nut adapted to engage with the threads of a bolt by pressing the nut onto the bolt to receive the bolt in an insertion hole thereof is disclosed, for example, in Japanese Patent Laid-Open No. 6-81830. The press-nut described in this publication comprises an outer shell body having a nut-like appearance and a tapered inner wall of which the inner diameter is reduced gradually towards an opening at one end thereof; a plurality of split nuts having tapered outer surfaces along the tapered inner wall of the outer shell body and threaded grooves formed on inner walls on the centre side thereof; and a coil spring to push the split nuts up onto the tapered inner wall of the shell body. Since this press-nut engages with the threads of a bolt when it is pressed onto the bolt so as to receive the bolt into an insertion hole, it moves directly to a clamping position when pressed forcefully onto the bolt, eliminating the previously required operation of rotating the nut to the clamping position. A press nut similar to the one described in the above publication is shown in Japanese Patent Laid-Open No. 6-147214, in particular in FIGS. 7 and 8, and in the related description thereof. Such a nut also eliminates any operation to be rotated to the clamping position.

Nevertheless, both of the above press-nuts take time in their assembly, that is, a plurality of split nuts have to be received in a hollow portion of the nut-like outer shell body and the coil spring to press up the split nuts then has to be inserted against the split nuts. These operations require time and labour. Besides, the assembly work requires skill as the coil spring sometimes falls off due to its resilient force. Further, in the nut described in Japanese Patent Laid-Open No. 6-147214, there is a risk of the cover slipping off. Since this press-nut is made of metal as are previously available nuts, split nuts hit each other if vibrated violently to produce noise or to scratch each other. Its manufacture is also time-consuming and costly.

SUMMARY OF THE INVENTION

It is an object of the present invention to provide a press-nut which does not need skill in assembly, produces no noise or causes no scratching of other nuts, and can be manufactured easily.

The present invention therefore provides a press-nut adapted to engage with the threads of a bolt by pressing the nut onto the bolt to receive the bolt in an insertion hole thereof; wherein the press-nut comprises a plastic nut body, and a plastic tubular cap member adapted to be coupled to the nut body to contain the nut body therein and to provide the press-nut with its external appearance; the cap member has a wide opening at one end so as to receive and contain the nut body and a small hole at the other end, through which the bolt is inserted; the nut body comprises a base portion, at least two screw portions forming a nut as a whole and having threaded grooves on the inner walls thereof, and spring portions extending from the base portion and connected to the respective screw portions with each spring portion resiliently biasing the corresponding screw portion so as to be pressed upward from the base portion; the outer surface of each screw portion is tapered gradually to reduce the diameter towards the bolt insertion hole on the other end; and the inner side of the cap member is also tapered to reduce the inner diameter thereof in accordance with the tapered surface of the screw portions.

As described above, the press-nut according to the present invention maintains the advantageous features of moving directly to the clamping position when pressed forcefully so as to receive the bolt in the insertion hole by means of the tapered surface of the cap member, the tapered surfaces of the screw portions and the spring portions, and of eliminating the work to rotate the nut. In addition, the nut made up of two components, i.e., a plastic nut body and a plastic cap member, solves problems inherent in press-nuts made of metal which produce noise and mutual scratching where subjected to vibrations. Since each of the components is made of plastic and moulded integrally, mass production at very low cost is possible. Further, the assembly of the press-nut of the present invention, comprising two components, i.e., the nut body and the cap member, is very easy as it is assembled simply when the cap member is pressed onto the nut body so as to receive the nut body. Particularly, in the press-nut according to the present invention, the spring portions which resiliently bias the screw portions are formed integrally with the respective screw portions and there is no need to use coil springs as provided in conventional press-nuts. Therefore, assembly operation is not disturbed by the spring portions falling off, and does not require any skill.

In the above-described press-nut the base portion of the nut body is formed with a pair of engagement means. A further pair of engagement means, to engage with the first-mentioned engagement means, is formed in the cap member. When the cap member is pressed so as to receive the nut body, the engagement means of the cap member come into engagement with the engagement means of the nut body, so that the cap member is easily connected to the nut body.

In the nut according to the present invention, the cap member may be in the form of a tubular hexagon. The cap member may also be shaped to be substantially cylindrical. On the sides thereof, it may be formed with a pair of diametrically facing protrusions, which extend longitudinally along the sides of the cap member to form two raised portions. In the nut according to the invention, each spring portion can comprise an elongated web in a one-cycle wave form. In the nut according to the invention, it is possible that the cap member is composed of a flange formed with a bolt insertion hole and a tubular portion extending downwardly from the flange and that a lower portion of the cap member is formed to be open. In this press-nut, it is also possible that the base portion of the nut body is shaped to fit with the lower portion of the cap member and that a stepped portion is formed on the top of the base portion for positioning the cap member in place.

In the nut according to the invention, a pair of screw portions and a pair of spring portions can be formed. In this case, the screw portions face each other with predetermined intervals between them. In the cap member, a pair of guide rods may be provided to guide the bolt to come in proper engagement with the screw portions. The pair of guide rods are formed to pass through the spaces between the screw portions. Because the axis of the bolt insertion hole is restrictedly aligned with the axis of the bolt, threaded grooves of the screw portions reliably engage with threads of the bolt. The guide rods located in the spaces between the screw portions prevent the screw portions from reducing the diameter unnecessarily. Moreover, when the cap member is rotated, the rotational force is transmitted to the screw portions via the guide rods and the screw portions are also moved in the direction of rotation to prevent the cap member from rotating ineffectively. For the use as stoppers when the cap member is connected to the nut body, the guide rods can be extended to reach the base portion of the nut body.

BRIEF DESCRIPTION OF THE DRAWINGS

The present invention is described further by way of two embodiments which will now be described with reference to the accompanying drawings, in which.

DESCRIPTION OF THE PREFERRED EMBODIMENT

Figure 1:
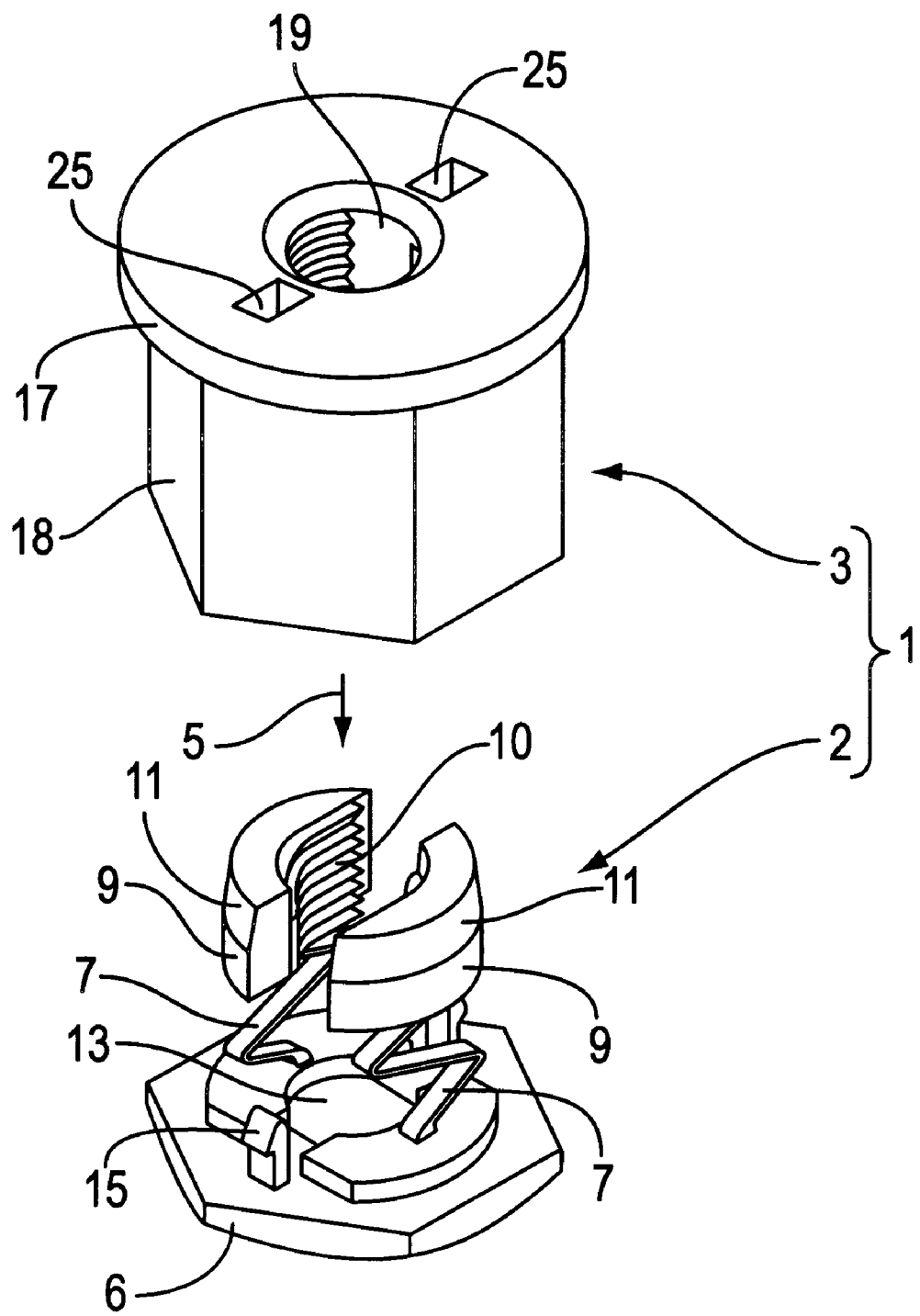
FIG. 1 is a perspective view of a press-nut before assembly.
Figure 2:
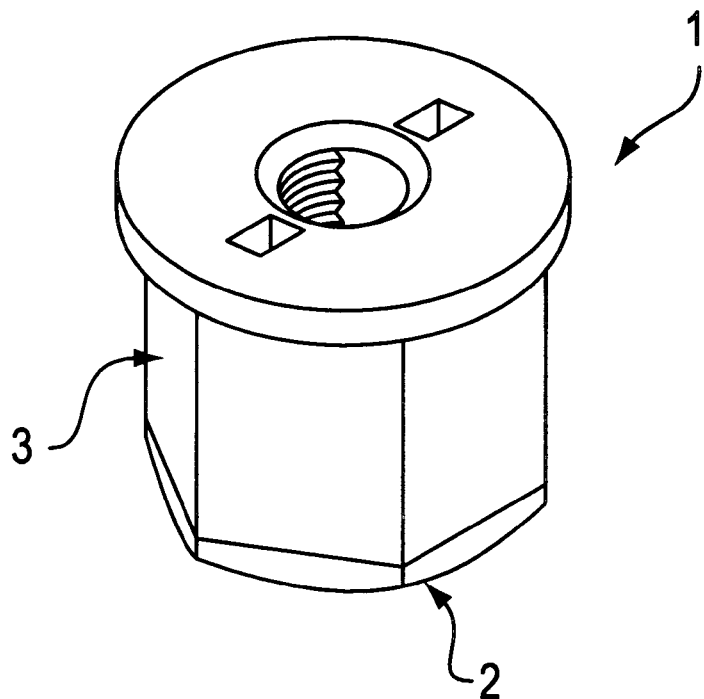
FIG. 2 is a perspective view of the press-nut after assembly.

As shown in FIG. 1, a press-nut 1 comprises a plastic nut body 2 and a plastic cap member 3 which is tubular in shape and provides the press-nut with its external appearance. As indicated by an arrow 5 in FIG. 1, the cap member 3 is pressed onto the nut member 2 so as to receive and contain the nut body 2. As illustrated in FIG. 2, the cap member 3 and the nut body 2 are pressed together and connected to each other so that the nut body is contained in the cap member 3, to form the press-nut 1.

The nut body 2 will be described with reference to FIGS. 3 to 6. The nut body 2 comprises a lower base portion 6, two spring portions 7 of elongated web as shaped in a one-cycle wave form extending upwardly from the base portion 6, and two screw portions 9 formed respectively at the upper ends of the spring portions 7. The spring portions 7 are moulded integrally with the respective screw portions as a connection between the screw portions 9 and the base portion 6. On the centre side or inner wall of each screw portion 9, threaded grooves 10 are formed for engagement with threads of a bolt. The two screw portions 9 and 9 face each other diametrically with spaces between them so as to form a nut portion as a whole, and a bolt insertion hole is defined in the centre. The number of screw portions 9 can be three or more. A spring portion is provided for each screw portion, independent of the number of screw portions.

Figure 3:
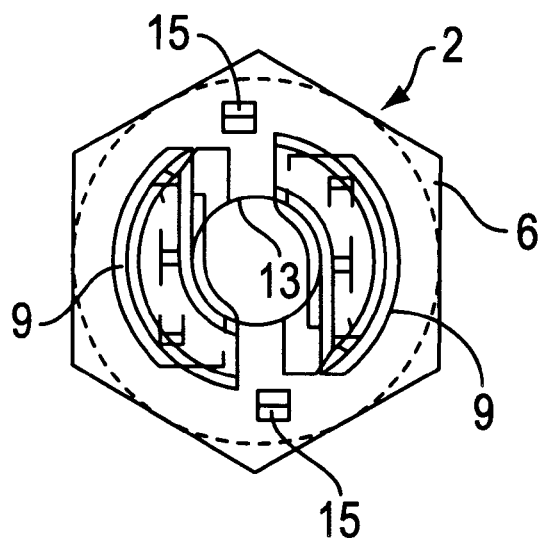
FIG. 3 is a plan view of a nut body of the press-nut.
Figure 4:
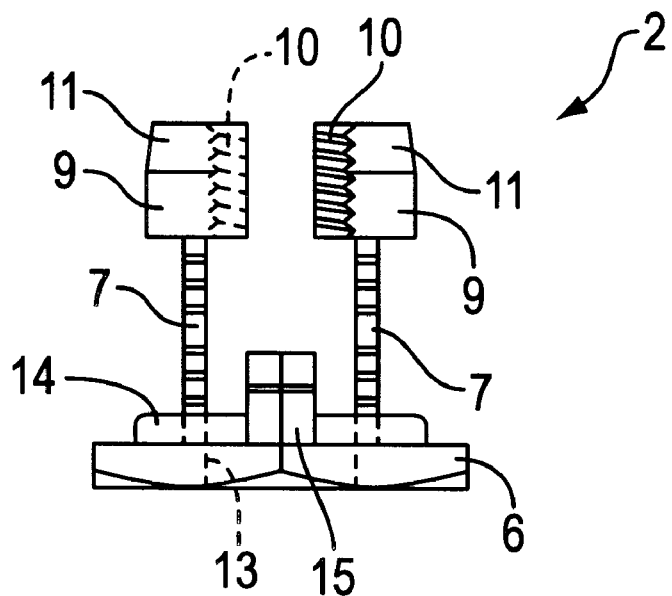
FIG. 4 is a front view of the nut body of FIG. 3.
Figure 5:
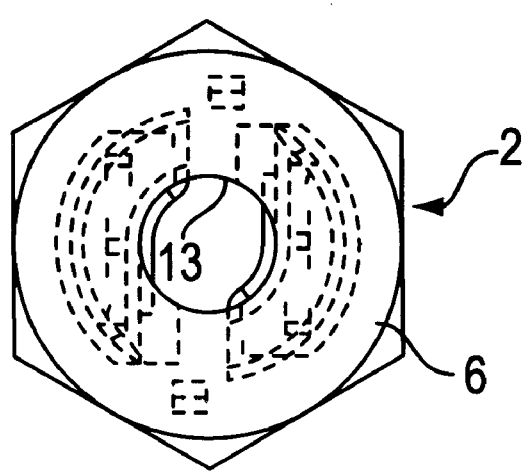
FIG. 5 is a bottom view of the nut body of FIG. 4.
Figure 6:
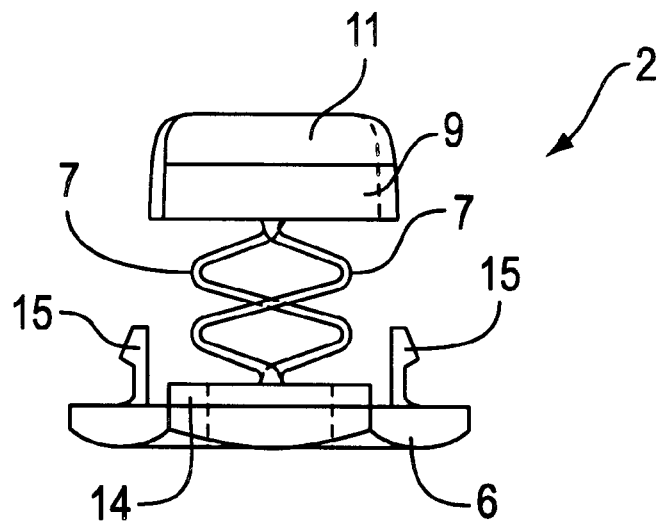
FIG. 6 is a right side view of the nut body of FIG. 4.
Figure 7:
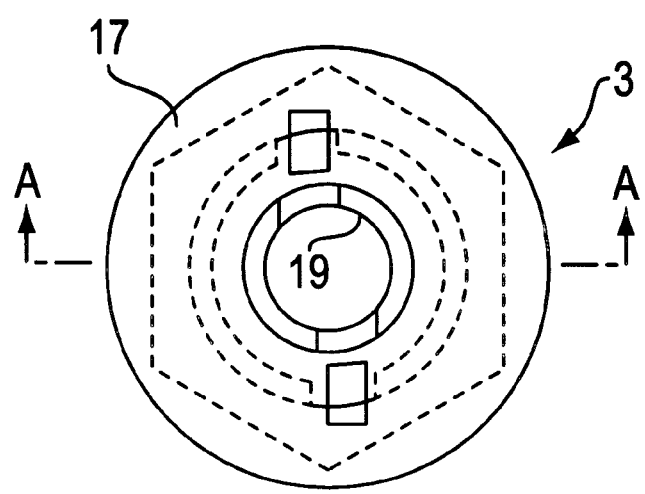
FIG. 7 is a plan view of a cap member of the press-nut.
Figure 8:
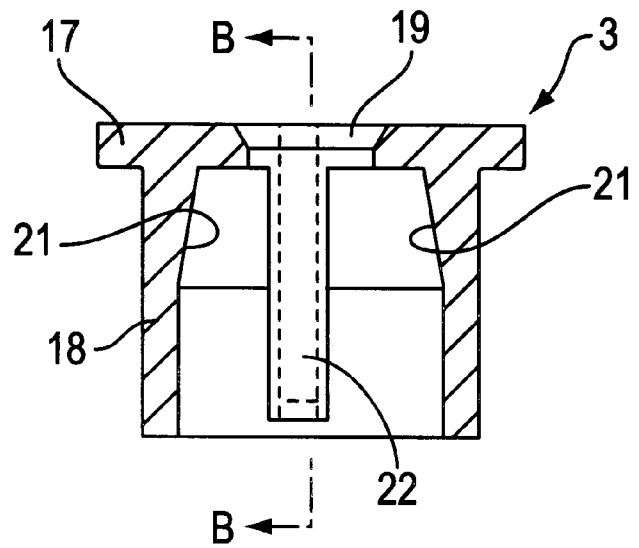
FIG. 8 is a sectional view taken along line A—A of the cap member of FIG. 7.
Figure 9:
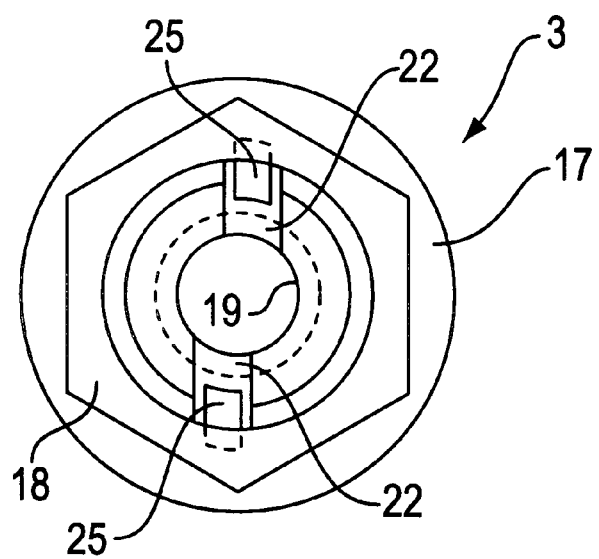
FIG. 9 is a bottom view of the cap member of FIG. 7.
Figure 10:
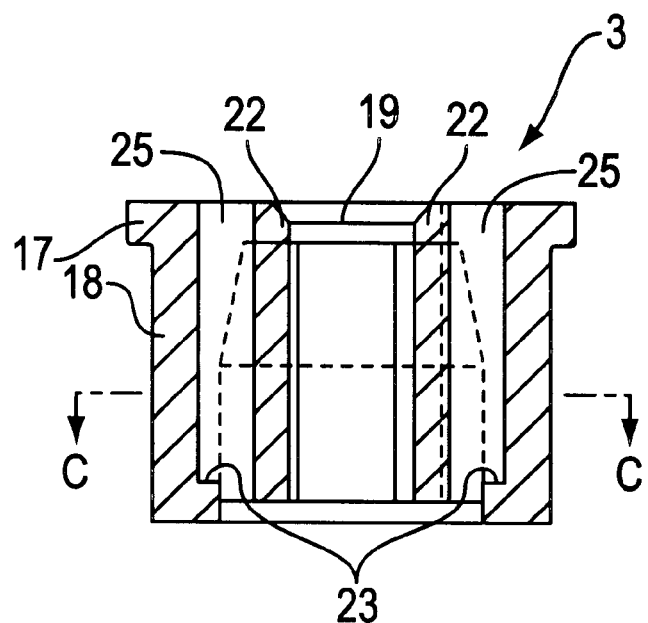
FIG. 10 is a sectional view taken along line B—B of the cap member of FIG. 8.
Figure 11:
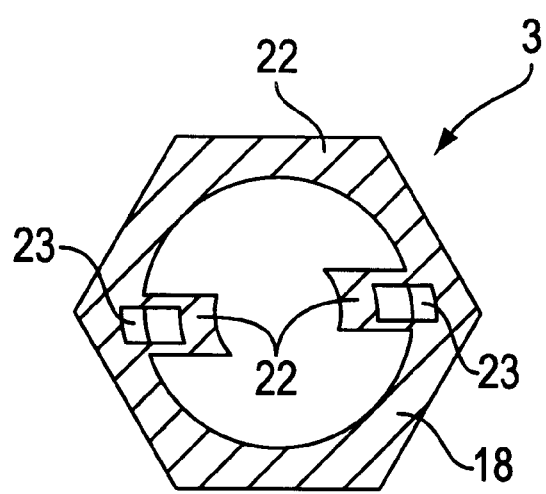
FIG. 11 is a sectional view taken along line C—C of the cap member of FIG. 10.

Each spring portion 7 resiliently presses its corresponding screw portion 9 so as to press it up from the base portion 6. Therefore, when the screw portions 9 are pressed from above in the unloaded condition shown in FIGS. 4 and 6, the screw portions 9 go down due to the flexibility of the spring portions 7 and releasing the pressing force allows the screw portions 9 to return to the illustrated unloaded position. An upper peripheral surface of each screw portion 9 is formed to have a tapered surface 11 whose diameter is gradually reduced upwardly. In the centre of the base portion 6, a bolt insertion hole 13 is formed in a position corresponding to the bolt insertion hole defined by the screw portions 9. The base portion 6 is shaped to fit with the lower portion of the cap member 3. Since the cap member 3 is formed in a tubular hexagon as shown in FIGS. 1 and 3 in this embodiment, the peripheral portion of the base portion 6 is shaped to match that hexagon. The top of the base portion 6 is formed with a stepped portion 14 which functions to position the lower portion of the cap member 3 properly relative to the base portion 6. For connecting the cap member 3, the top of the base portion 6 is also formed with a pair of engagement pawls 15 and 15 facing each other diametrically.

The cap member 3 will now be described with reference to FIGS. 7 to 11. The cap member 3 comprises a disc-like flange 17 on the top thereof, and a tubular portion 18 extending downwardly from the flange 17. The flange 17 forms a contact plane with an attachment member. The flange 17 also serves as a mark for the inserting direction by the operator upon attaching this press-nut to a bolt. In the first embodiment, the tubular portion 18 is a tubular hexagon and the press-nut 1 forms a hexagon nut as a whole. In the centre of the flange 17, a bolt insertion hole 19 through which a bolt is inserted is formed. A lower portion of the tubular portion 18 is open and the opening is large enough to receive the nut body 2 easily.

In the tubular portion 18, the inside portion close to the flange 17 is formed so as to have a tapered surface 21 towards the bolt insertion hole 19 so that the inner diameter of the tubular portion 18 reduces gradually. The tapered surface 21 is formed corresponding to the tapered surfaces 11 of the screw portions 9. As the screw portions 9 are pressed upwardly by means of the spring portions 7, the tapered surfaces 11 of the screw portions ascend along the tapered surface 21 of the tubular portion. The two screw portions are brought inside gradually to become close to each other inside, so as to reduce the inner diameter of the internal threads of the nut formed by the two screw portions 9. The inner diameter of a portion lower than the tapered surface 21 of the tubular portion 18 is selected so that when the screw portions 9 come in contact with the inner wall of the tubular portion, the bolt insertion hole in the two screw portions 9 can be slightly larger than the outer diameter of bolt. Therefore, when the top of the screw portions 9 is pressed downward, the screw portions 9 can go lower than the tapered surface 21 owing to the resilience of the spring portions 7. With this descent, the two screw portions 9 move away from each other to make the bolt insertion hole between them larger than the outer diameter of the external threads of the bolt. Thus, the press-nut of the present invention can move directly to the clamping position simply when pressed onto the bolt without requiring any rotation. When this movement is stopped, the pressing force applied to the screw portions 9 is lost. Then, the screw portions 9 are pushed upward by the returning force of the spring portions 8 and are moved inside to engage firmly with the external threads of the bolt. Rotating the cap member 3 in this state can tighten the clamping, as is the case of any standard nut.

Inside the cap member 3, a pair of guide rods 22 extend downwardly from the flange 17 and are diametrically opposed to each other. The guide rods 22 are positioned so as to pass through the gap between the two screw portions 9 of the nut body 2. To serve as stoppers when the cap member 3 is connected to the nut body 2, the guide rods 22 extend to reach the base portion 6 of the nut body 2. The guide rods 22 which fill the gap between the screw portions 9 of the nut body 2 serve to guide and restrict a bolt so that the axis of the bolt passing through the bolt insertion hole of the screw portions 9 can coincide with the axis of the bolt insertion hole, thus ensuring firm engagement between threaded grooves 10 of the screw portions 9 and threads of the bolt.

Further, since each guide rod 22 remains in the gap between the screw portions 9, the guide rods 22 can prevent the screw portions 9 from unnecessary reduction in the diameter when the screw portions 9 are moved to reduce the diameter by the function of the tapered surfaces 11 and 21. This prevents the bolt insertion hole defined by the two screw portions 9 from becoming so small that bolt insertion is hindered. Because the guide rods 22 are adjacent to the screw portions 9, when the guide rods 22 move in the direction of rotation of the rotated cap member 3, the guide rods 22 transmit the force of rotation to the screw portions 9 so as to cause the screw portions 9 to move together with the guide rods, thereby preventing the cap member 3 from rotating alone (that is, ineffective rotation). Further, when the cap member 3 is connected to the nut body 2, the guide rods 22 extend to reach the base portion of the nut body to function as stoppers, so that the base portion 6 of the nut body 2 and the lower end of the cap member are properly engaged.

At a lower portion of the tubular portion 18 of the cap member 3, a pair of engagement portions 23 is formed for engagement with the engagement pawls 15 formed in the base portion 6 of the nut body 2. In the first embodiment, the engagement portions 23 are formed by making use of the guide rods 22. A centre portion of each guide rod 22 has a through-hole 25 for moulding purposes. The engagement portions 23 are provided to form a engagement shoulder at the lower end portion of the tubular portion 18. Since the engagement portions 23 are formed adjacent to the guide rods 22 as stated above, when the cap member 3 is connected to the nut body 2, each engagement pawl 15 is in engagement with its corresponding engagement portion 23 in the state that the lower ends of the guide rods 22 are in contact with the base portion 6, thereby obtaining more firm engagement.

Figure 12:
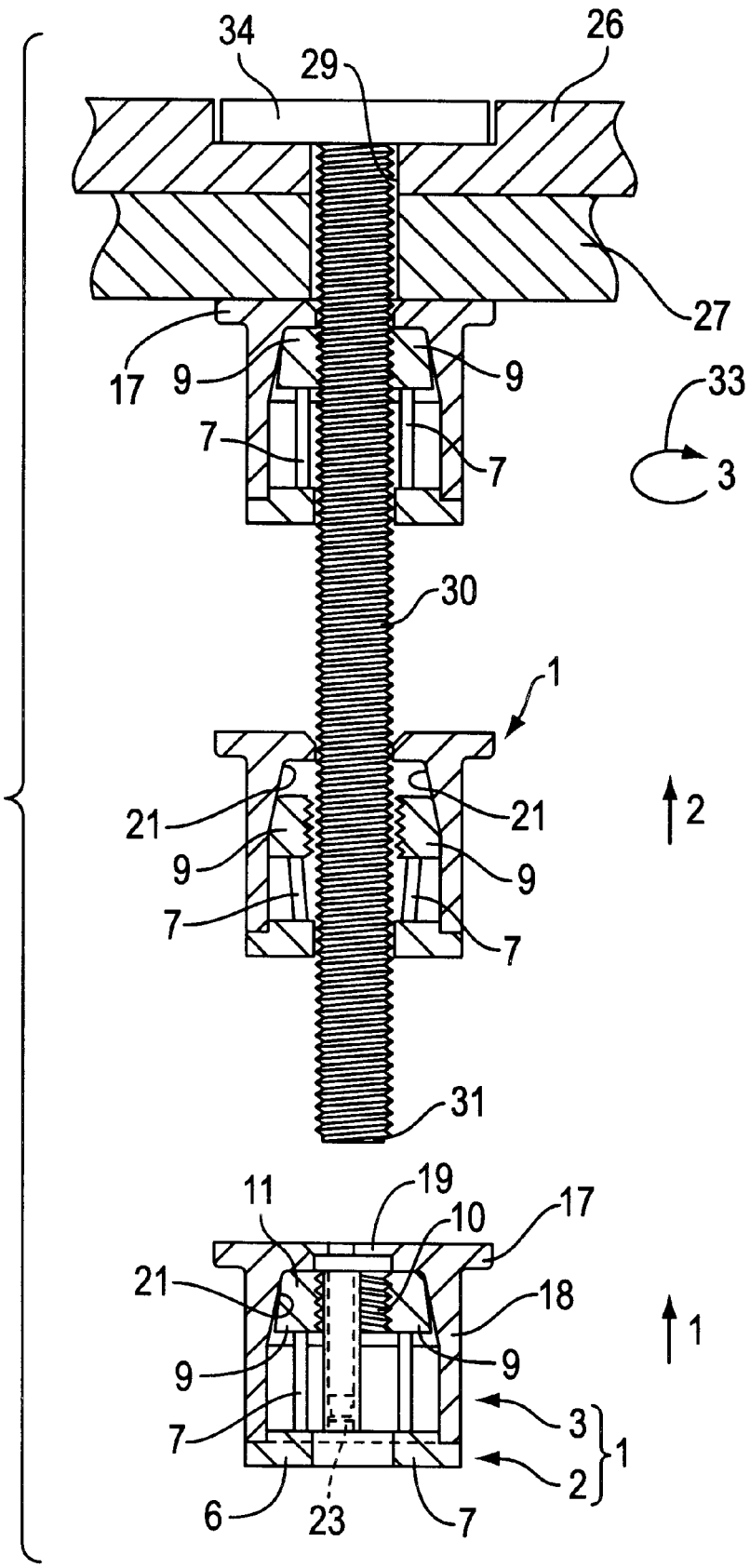
FIG. 12 is an illustration showing the procedure of attaching the first embodiment of a press-nut to a bolt.

The attachment of two panels using the press-nut 1 of the above described structure is explained with reference to FIG. 12. A first panel 26 and a second panel 27 are put together and a bolt 30 is inserted in a mounting hole 29. Towards one end 31 of the bolt 30 projecting from the second panel 27, the press-nut 1 of the present invention is held, with the flange 17 of the cap member 3 facing upward, so that the bolt insertion hole 19 meets the bolt end (see step 1 of FIG. 12). In this condition, the screw portions 9 are pressed upward by the spring portions 7 so that the diameter of the internal threads of the nut defined by the tapered surfaces 11 of the screw portions 9 and the tapered surface 21 of the tubular portion remains small.

Next, the press-nut 1 is pressed up so that the end 31 of the bolt 30 can pass through the bolt insertion hole 19. This upward pressing causes a force to press the tops of the screw portions 9 downward. The resilience of the spring portions 7 allows the screw portions 9 to descend along the tapered surface 21. As they are descending, the two screw portions 9 move away from each other and the bolt insertion hole between them becomes larger than the outer diameter of the male screw of the bolt 30. When pressed up strongly (see step 2), the press-nut 1 can directly rise to the clamping position of the step 3 along the bolt 30, without the need for rotation. For instance, if the bolt 30 is as long as illustrated and the nut must be rotated, this ascending operation would be time consuming and troublesome. However, since it is sufficient to move it only linearly, in the present invention, the operation is accomplished easily and promptly. Because the guide rods 22 of the cap member 3 fill the gap between the screw portions 9, the press-nut 1 is capable of moving while maintaining its appropriate position with respect to the bolt 30.

Upon stopping the rise, the pressing force to the screw portions 9 is lost and the spring portions 7 operate so as to bring the screw portions 9 upward. By this return force, the screw portions 9 are pressed upward. The two screw portions 9 are then moved inside and closely together by the tapered surface and come into firm engagement with the external threads of the bolt (see step 1). By rotating the cap member 3 as indicated by an arrow 33 in this clamping position, clamping is tightened in the same way as with standard nuts, and the two panels 26 and 27 are coupled reliably by means of a head 34 of the bolt 30 and the flange 17 of the press-nut 1.

Figure 13:
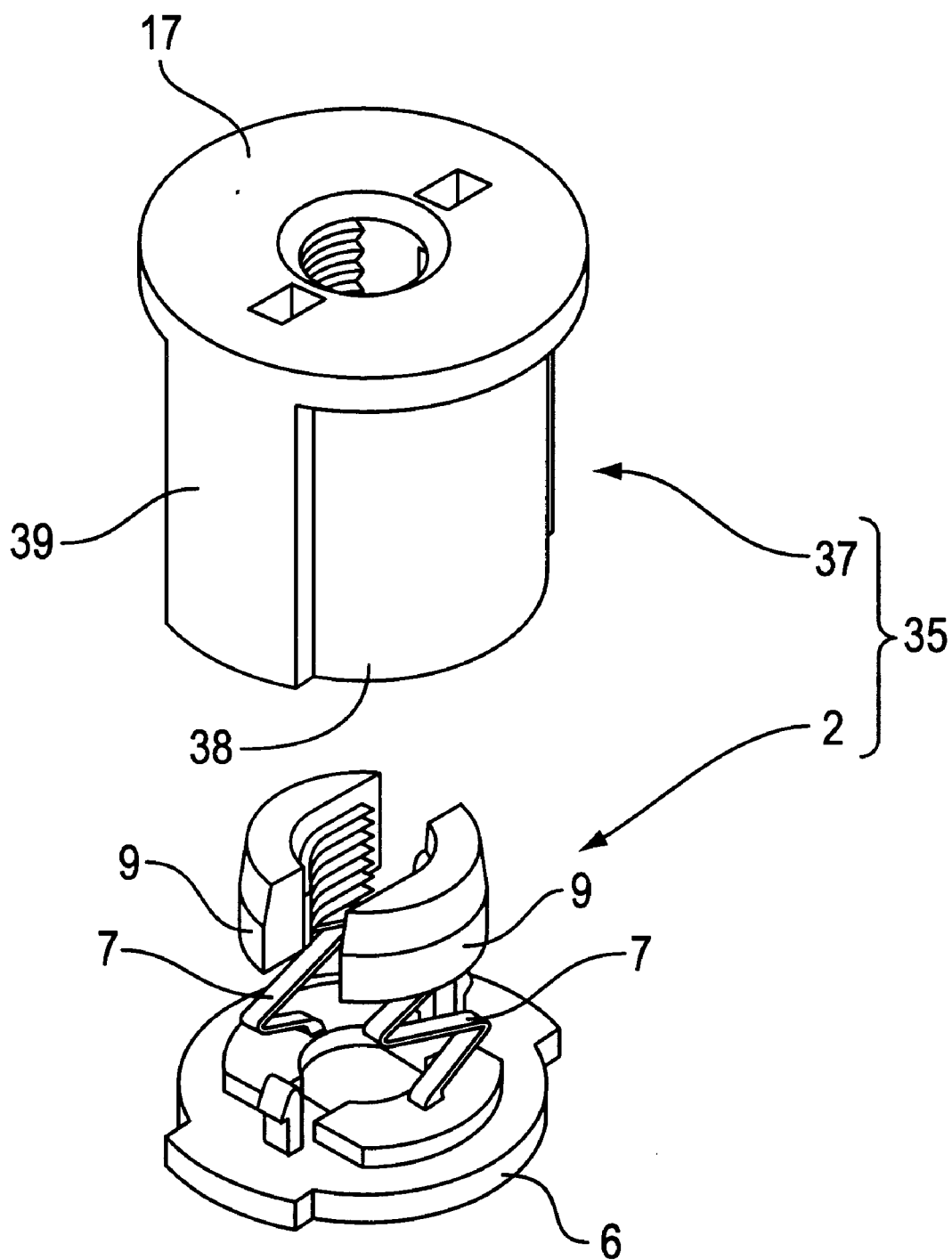
FIG. 13 is a perspective view of a second embodiment of a press-nut before assembly.
Figure 14:
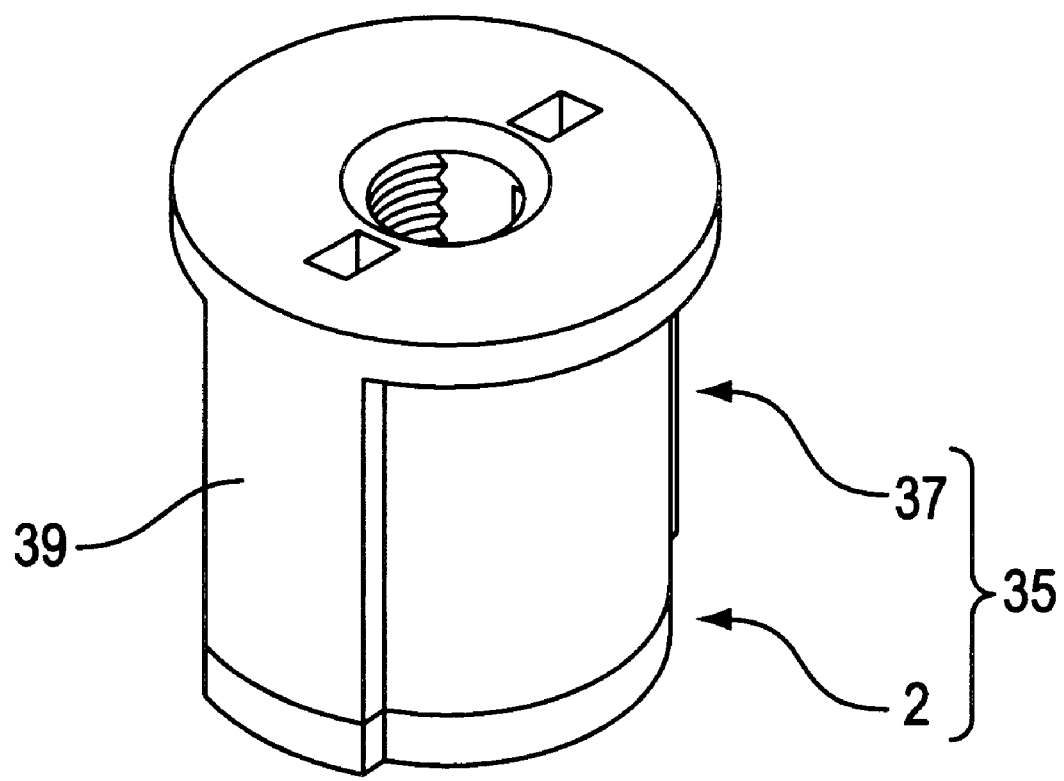
FIG. 14 is a perspective view of the second embodiment of a press-nut after assembly.

FIGS. 13 and 14 show a second embodiment of a press-nut 35. The press-nut 35 comprises a plastic nut body 2 and a plastic cap member 37. The nut body 2 is the same as that of the first embodiment press-nut 1, and will not be described in detail. The cap member 37 which comprises a flange 17 and a tubular portion 38 is different from the cap member 3 of the first embodiment only in its external appearance. Since the flange 17 and all of the other portions are the same as those of the cap member 3 of the first embodiment, they will not be described in detail. In the second embodiment, the tubular portion 38 of the cap member 37 is formed to be substantially cylindrical, but the sides of the cap member 27 are formed with a pair of protrusions 39 projecting radially outwardly. The protrusions 39 respectively extend on the sides of the cap, member 37 longitudinally (i.e., vertically in the drawing). The protrusions allow the cap member 37 to be rotated by means of a tool, and further to be fixed so as to prevent the press-nut 35 from rotating together with the rotating bolt. A base portion 6 of the nut body is formed to fit with the shape of the lower end of the tubular portion 38. The shape of the tubular portion 38 is not limited to the illustrated one. It may be a square cylinder or an oval cylinder or in any other shape as long as the tubular portion can be prevented from rotating together with the rotating bolt.

When the press-nut of the present invention is pressed forcefully, the nut moves directly to its clamping position to receive the bolt in the insertion hole by means of the tapered surface of the cap member, the tapered surfaces of the screw portions and the spring portions. Thus, the advantage that nut rotation is unnecessary is maintained. The nut is made up of two components, i.e., a plastic nut body and a plastic cap member, and solves problems inherent in press-nuts made of metal such as noise produced or scratching of other nuts when subjected to vibration. As each of the two components is made of plastic and moulded integrally, mass production at low cost is possible. The press-nut of the present invention, comprising two components, i.e., a nut body and a cap member, can be assembled by simply pressing the cap member onto the nut body so as to receive the nut body therein, simplifying the assembly operation. In the press-nut according to the present invention, the spring portions to bias the screw portions resiliently are moulded integrally with the respective screw portions, requiring no coil spring as used in conventional press-nuts. Therefore, the spring portions do not fall off during the assembly operation. As the assembly operation is not hindered by the spring portions, no skill is needed for the assembly.

What is claimed is:

1. A press-nut adapted to engage with the threads of a bolt by pressing the nut onto the bolt to receive the bolt in an insertion hole thereof; wherein the press-nut comprises a plastic nut body, and a plastic tubular cap member adapted to be coupled to the nut body to contain the nut body therein and to provide the press-nut with its external appearance; the cap member has a wide opening at one end so as to receive and contain the nut body and a small hole at the other end, through which the bolt is inserted; the nut body comprises a base portion, at least two screw portions forming a nut as a whole and having threaded grooves on the inner walls thereof, and spring portions extending from the base portion and connected to the respective screw portions with each spring portion resiliently biasing the corresponding screw portion so as to be pressed upward from the base portion; the outer surface of each screw portion is tapered gradually to reduce the diameter towards the bolt insertion hole on the other end; and the inner side of the cap member is also tapered to reduce the inner diameter thereof in accordance with the tapered surface of the screw portions; the base portion of the nut body is formed with a pair of engagement means and the cap member is formed with a pair of engagement means to engage with the engagement means of the cap member, so that the cap member and the nut body are coupled together when the engagement means of the cap member come into engagement with the engagement means of the nut.

2. A nut according to claim 1 characterised in that the cap member is in the form of a tubular hexagon.

3. A press-nut adapted to engage with the threads of a bolt by pressing the nut onto the bolt to receive the bolt in an insertion hole thereof; wherein the press-nut comprises a plastic nut body, and a plastic tubular cap member adapted to be coupled to the nut body to contain the nut body therein and to provide the press-nut with its external appearance; the cap member has a wide opening at one end so as to receive and contain the nut body and a small hole at the other end, through which the bolt is inserted; the nut body comprises a base portion, at least two screw portions forming a nut as a whole and having threaded grooves on the inner walls thereof, and spring portions extending from the base portion and connected to the respective screw portions with each spring portion resiliently biasing the corresponding screw portion so as to be pressed upward from the base portion; the outer surface of each screw portion is tapered gradually to reduce the diameter towards the bolt insertion hole on the other end; and the inner side of the cap member is also tapered to reduce the inner diameter thereof in accordance with the tapered surface of the screw portions; wherein the cap member is substantially cylindrical in form, and the side of the substantially cylindrical cap member is provided with a pair of protrusions projecting radially outwardly and being diametrically opposite to each other, and each of the protrusions extends longitudinally along the side of the cap member.

4. A press-nut adapted to engage with the threads of a bolt by pressing the nut onto the bolt to receive the bolt in an insertion hole thereof; wherein the press-nut comprises a plastic nut body, and a plastic tubular cap member adapted to be coupled to the nut body to contain the nut body therein and to provide the press-nut with its external appearance; the cap member has a wide opening at one end so as to receive and contain the nut body and a small hole at the other end, through which the bolt is inserted; the nut body comprises a base portion, at least two screw portions forming a nut as a whole and having threaded grooves on the inner walls thereof, and spring portions extending from the base portion and connected to the respective screw portions with each spring portion resiliently biasing the corresponding screw portion so as to be pressed upward from the base portion; the outer surface of each screw portion is tapered gradually to reduce the diameter towards the bolt insertion hole on the other end; and the inner side of the cap member is also tapered to reduce the inner diameter thereof in accordance with the tapered surface of the screw portions; and wherein each of the spring portions comprises an elongated strand in a one-cycle wave form.

5. A press-nut adapted to engage with the threads of a bolt by pressing the nut onto the bolt to receive the bolt in an insertion hole thereof; wherein the press-nut comprises a plastic nut body, and a plastic tubular cap member adapted to be coupled to the nut body to contain the nut body therein and to provide the press-nut with its external appearance; the cap member has a wide opening at one end so as to receive and contain the nut body and a small hole at the other end, through which the bolt is inserted; the nut body comprises a base portion, at least two screw portions forming a nut as a whole and having threaded grooves on the inner walls thereof, and spring portions extending from the base portion and connected to the respective screw portions with each spring portion resiliently biasing the corresponding screw portion so as to be pressed upward from the base portion; the outer surface of each screw portion is tapered gradually to reduce the diameter towards the bolt insertion hole on the other end; and the inner side of the cap member is also tapered to reduce the inner diameter thereof in accordance with the tapered surface of the screw portions; and wherein the cap member comprises a flange formed with a bolt insertion hole and a tubular portion extending downwardly from the flange, and a lower end portion of the cap member is open.

6. A nut according to claim 5 characterised in that the base portion of the nut body is made in such a form that fits with the lower portion of the cap member and the top of the base portion is formed with a stepped portion to position the cap member in place.

7. A press-nut adapted to engage with the threads of a bolt by pressing the nut onto the bolt to receive the bolt in an insertion hole thereof; wherein the press-nut comprises a plastic nut body, and a plastic tubular cap member adapted to be coupled to the nut body to contain the nut body therein and to provide the press-nut with its external appearance; the cap member has a wide opening at one end so as to receive and contain the nut body and a small hole at the other end, through which the bolt is inserted; the nut body comprises a base portion, at least two screw portions forming a nut as a whole and having threaded grooves on the inner walls thereof, and spring portions extending from the base portion and connected to the respective screw portions with each spring portion resiliently biasing the corresponding screw portion so as to be pressed upward from the base portion; the outer surface of each screw portion is tapered gradually to reduce the diameter towards the bolt insertion hole on the other end; and the inner side of the cap member is also tapered to reduce the inner diameter thereof in accordance with the tapered surface of the screw portions; said screw portions and said spring portions, respectively, being provided in pairs.

8. A nut according to claim 7 characterised in that the screw portions face each other with predetermined intervals between them, and the cap member has a pair of guide rods to guide the bolt for its proper engagement with the screw portions with the guide rods extending through the gap between the screw portions.

9. A nut according to claim 8 characterised in that the guide rods reach the base portion of the nut body and therefore function as stops when the cap member is connected to the nut body.

* * * * *